United States Patent
Zhang et al.

(10) Patent No.: US 9,485,235 B2
(45) Date of Patent: Nov. 1, 2016

(54) SYSTEMS AND METHODS FOR INTER-NETWORK SERVICE SELECTION

(71) Applicant: Qualcomm Incorporated, San Diego, CA (US)

(72) Inventors: Wentao Zhang, Beijing (CN); Jun Wang, San Diego, CA (US); George Cherian, San Diego, CA (US); Jen Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 13/754,684

(22) Filed: Jan. 30, 2013

(65) Prior Publication Data

US 2013/0232555 A1 Sep. 5, 2013

Related U.S. Application Data

(60) Provisional application No. 61/606,293, filed on Mar. 2, 2012.

(51) Int. Cl.

| | |
|---|---|
| *G06F 15/16* | (2006.01) |
| *H04L 29/06* | (2006.01) |
| *H04L 12/803* | (2013.01) |
| *H04W 12/08* | (2009.01) |
| *H04W 48/10* | (2009.01) |
| *H04W 48/08* | (2009.01) |
| *G06F 11/30* | (2006.01) |

(52) U.S. Cl.
CPC ............. *H04L 63/08* (2013.01); *H04L 47/125* (2013.01); *H04W 12/08* (2013.01); *H04W 48/08* (2013.01); *H04W 48/10* (2013.01)

(58) Field of Classification Search
CPC ....... H04L 63/08; H04L 63/02; H04L 63/10; G06F 21/6218; H04W 12/06
USPC ........... 713/68–174, 182–186, 202; 709/225, 709/229; 726/2–8
See application file for complete search history.

(56) References Cited

U.S. PATENT DOCUMENTS

| | | | |
|---|---|---|---|
| 6,463,286 B1 | 10/2002 | Salminen | |
| 8,169,933 B2 | 5/2012 | Srinivasan et al. | |
| 8,249,498 B1 | 8/2012 | Pulugurta | |
| 8,341,717 B1* | 12/2012 | Delker | H04L 63/20 705/56 |
| 2004/0109431 A1 | 6/2004 | Abrahamson et al. | |
| 2006/0128392 A1 | 6/2006 | Turina et al. | |
| 2007/0070935 A1 | 3/2007 | Prakash et al. | |
| 2007/0297378 A1 | 12/2007 | Poyhonen et al. | |
| 2009/0125971 A1* | 5/2009 | Belz | H04N 7/163 725/153 |
| 2010/0003980 A1* | 1/2010 | Rune | H04W 48/16 455/436 |
| 2010/0255849 A1 | 10/2010 | Ore | |
| 2011/0058480 A1 | 3/2011 | Dahlen | |

FOREIGN PATENT DOCUMENTS

| | | |
|---|---|---|
| CN | 101472357 A | 7/2009 |
| CN | 101795477 A | 8/2010 |
| CN | 101883407 A | 11/2010 |
| EP | 2211576 A1 | 7/2010 |

OTHER PUBLICATIONS

International Search Report and Written Opinion—PCT/US2013/028744—ISA/EPO—Jul. 11, 2013.

* cited by examiner

*Primary Examiner* — Evans Desrosiers
(74) *Attorney, Agent, or Firm* — Anthony R. Morris

(57) ABSTRACT

Systems, methods, and devices for inter-network service selection are described herein. Through the use of one or more of device identifiers and device classes, information including a randomization metric can be transmitted to networked devices indicating which devices and/or device classes are permitted or denied to access a given network service. Equipment seeking access may alter the selection based on this information. Equipment providing access may enforce access request based on this information. As an example, selection between eHRPD and LTE may be load balanced based on device class or identifiers.

52 Claims, 8 Drawing Sheets

SYSTEMS AND METHODS FOR INTER-NETWORK SERVICE SELECTION

CROSS-REFERENCE TO RELATED APPLICATIONS

This application claims a priority benefit under 35 U.S.C. §119(e) from U.S. Provisional Application No. 61/606,293 filed Mar. 2, 2012 the contents of which are hereby incorporated by reference in their entirety.

BACKGROUND

1. Field

The present application relates generally to wireless communications, and more specifically to systems, methods, and devices for inter-network service selection.

2. Background

Wireless communication systems are widely deployed to provide various types of communication content such as voice and data. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded high voice quality, reliable service, and low prices.

To accommodate increasing demand, evolution of core networks of wireless communication systems followed from evolution of radio interfaces. For example, System Architecture Evolution (SAE) lead by 3GPP aims to evolve a Global System for Mobile communications (GSM)/General Packet Radio Service (GPRS) core network. The resultant Evolved Packet Core (EPC) is a multi-access core network based on the Internet Protocol (IP) that enables operators to deploy and utilize one common packet-based core network with a plurality of radio access technologies. The EPC provides optimized mobility for mobile devices and enables efficient handovers between different radio access technologies (e.g., between LTE and High Rate Packet Data (HRPD)). In addition, standardized roaming interfaces enable operators to offer services to subscribers across a variety of access technologies.

As the number and types of devices capable of accessing operator networks increases, to improve overall network performance, a need exists to allow network operators to improve the management of the use of network services.

SUMMARY

Various implementations of systems, methods and devices within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

In one aspect, a method for controlling network communications is provided. The method includes transmitting a first message including a first set of permissions to access a network. The method further includes identifying a change in at least one of a network characteristic or information associated with a wireless device. The method also includes generating a second set of access permissions to access the network, the generating based on the identified change in network characteristic or wireless device information. The method also includes transmitting a second message including the second set of permissions to access the network, wherein each permission of the first set of permissions and the second set of permissions is associated with at least one of a plurality of classes of devices. Each permission also includes available access technologies for each device class and a randomization metric for each available access technology.

In another aspect, an apparatus for controlling network communications is provided. The apparatus includes a transmitter configured to transmit a first message indicating a first set of permissions to access a network. The apparatus also includes a processor configured to identifying a change in at least one of a network characteristic or information associated with a wireless device and to generate a second set of access permissions to access the network, the generating based on the identified change in network characteristic or wireless device information. The transmitter is further configured to a second message including the second set of permissions to access the network. Each permission of the first set of permissions and the second set of permissions is associated with at least one of a plurality of classes of devices. Each permission also includes available access technologies for each device class and a randomization metric for each available access technology.

In a further aspect, a computer-readable storage medium comprising instructions executable by a processor of an apparatus is provided. The instructions cause the apparatus to transmit a first message including a first set of permissions to access a network. The instructions further cause the apparatus to identify a change in at least one of a network characteristic or information associated with the wireless device. The instructions further cause the apparatus to generate a second set of access permissions to access the network, the generating based on the identified change in network characteristic or wireless device information. The instructions further cause the apparatus to transmit a second message including the second set of permissions to access the network. Each permission of the first set of permissions and the second set of permissions is associated with at least one of a plurality of classes of devices. Each permission also includes available access technologies for each device class and a randomization metric for each available access technology.

In a further aspect, an apparatus for communicating in a wireless network is provided. The apparatus includes means for transmitting a first message including a first set of permissions to access a network. The apparatus includes means for identifying a change in at least one of a network characteristic or information associated with the wireless device. The apparatus includes means for generating a second set of access permissions to access the network, the generating based on the identified change in network characteristic or wireless device information. The means for transmitting are further configured to transmit a second message including the second set of permissions to access the network. Each permission of the first set of permissions and the second set of permissions is associated with at least one of a plurality of classes of devices. Each permission also includes available access technologies for each device class and a randomization metric for each available access technology.

In some of the above described aspects, the network characteristic may include one or more of a network load, a network frequency load, a number of connections to the network, a number of connections to a frequency of the network, a loaded indicator, a percentage of remaining resources, access permissions for a percentage of users, access permissions for a class of devices, access permissions for one or more identifiers of devices, access permissions for a distribution of devices, and a number of connections with the network. The information associated with the wireless device may include one or more of a class for the device, a capability of the device, a location of the device, an access priority level, a quality of service requirement, and an application identifier. The access permissions for the network may include a radio access technology for accessing the network, in some implementations. Furthermore, the radio access technology may include at least one of long term evolution based access, evolved high rate data packet based access, and cdma2000 spread spectrum system access. In certain embodiments, a permission of the first set of permissions or the second set of permissions may include an identifier for a specific wireless device. The messages described in the aspects above may be unicast, multicast, or broadcast messages.

In some implementations, the method or the apparatus implementing aspects of the method may include or be configured for receiving a registration request from the wireless device, the registration request including an identifier for the wireless device, determining a device class for the wireless device based at least in part on the received identifier, and transmitting a message including the device class for the wireless device. The identifier for a wireless device or a specific wireless device may include on or more of an IMSI, a MEID, and a UATI.

In certain desirable configurations of the aspects described above, the method or the apparatus implementing aspects of the method may include or be configured for receiving an access request for the wireless device. Determining access permissions for the network for the wireless device may include comparing the identifier for the wireless device or a device class associated with the wireless device with a list indicating devices permitted access.

The randomization metric may include at least one of a selection probability, a selection threshold, and a selection range. The method or the apparatus implementing aspects of the method may include or be configured for receiving from another network a message including a third set of access permissions for the another network, receiving an access request from a wireless device included in the classes of devices included in the third set of access permissions, and transmitting an access response message based at least in part on a comparison of the message and the access request. In some implementations, transmitting the access response message may include transmitting a message to the wireless device directing the wireless device to communicate with the first network when the first wireless device is not associated with a class of wireless devices included in the access permissions, strike that. Furthermore, transmitting the access response message may include transmitting a message to the wireless device indicating successful access to the second network.

In another aspect, a method for selecting communication network access is provided. The method includes storing, at a wireless device, a class and an identifier for the wireless device. The method further includes receiving a first message including a first set of permissions to access a network, wherein each permission of the first set of permissions is associated with at least one of a plurality of classes of devices. Each permission also includes available access technologies for each device class and a randomization metric for each available access technology. The method further includes identifying a permission of the first set of permissions based in part on at least one of the stored device class and the stored identifier. The method also includes selecting an access technology associated with the identified permission based at least in part on the available access technologies for each device class and the randomization metric for each available access technology.

In another aspect, an apparatus for selecting a communication network is provided. The apparatus includes a memory storing a class and an identifier for the apparatus. The apparatus includes a receiver configured to receive a first message including a first set of permissions to access a network, wherein each permission of the first set of permissions is associated with at least one of a plurality of classes of devices. Each permission also includes available access technologies for each device class and a randomization metric for each available access technology. The apparatus also includes a service selection circuit configured to identify a permission of the first set of permissions based in part on at least one of the stored device class and the stored identifier and to select an access technology associated with the identified permission based at least in part on the available access technologies for each device class and the randomization metric for each available access technology.

In a further aspect, a computer-readable storage medium comprising instructions executable by a processor of an apparatus is provided. The instructions cause the apparatus to store a class and an identifier for the apparatus. The instructions further cause the apparatus to receive a first message including a first set of permissions to access a network, wherein each permission of the first set of permissions is associated with at least one of a plurality of classes of devices. Each permission also includes available access technologies for each device class and a randomization metric for each available access technology. The instructions also cause the apparatus to identify a permission of the first set of permissions based in part on at least one of the stored device class and the stored identifier. The instructions further cause the apparatus to select an access technology associated with the identified permission based at least in part on the available access technologies for each device class and the randomization metric for each available access technology.

In yet another aspect, a further apparatus for selecting communication network access is provided. The apparatus includes means for storing a class and an identifier for the apparatus. The apparatus includes means for receiving a first message including a first set of permissions to access a network, wherein each permission of the first set of permissions is associated with at least one of a plurality of classes of devices. Each permission also includes available access technologies for each device class and a randomization metric for each available access technology. The apparatus includes means for identifying a permission of the first set of permissions based in part on at least one of the stored device class and the stored identifier. The apparatus includes means for selecting an access technology associated with the identified permission based at least in part on the available access technologies for each device class and the randomization metric for each available access technology.

In some of the above described aspects, the method may include or the apparatus may be configured to receive a second message including a second set of access permissions for the network, wherein the permission is identified and selecting an access technology is based at least part on the received second message. The access technology may include at least one of long term evolution based access, evolved high rate data packet based access, and cdam2000 spread spectrum system access. In some aspects, at least one of a device class and an identifier for the wireless device may be associated with an access priority level, and selecting the access technology may be further based on the access priority level. The storage of the device class may include, in certain implementations, receiving a message including the device class and storing the device class. Furthermore, the identifier for the wireless device may include one or more of an IMSI, a MEID, and a UATI.

The randomization metric may include one of a selection probability, a selection threshold, and a selection range. The access technology may be selected by generating a random value and selecting the access technology based on a comparison of the random value to the randomization metric.

Figure 1:
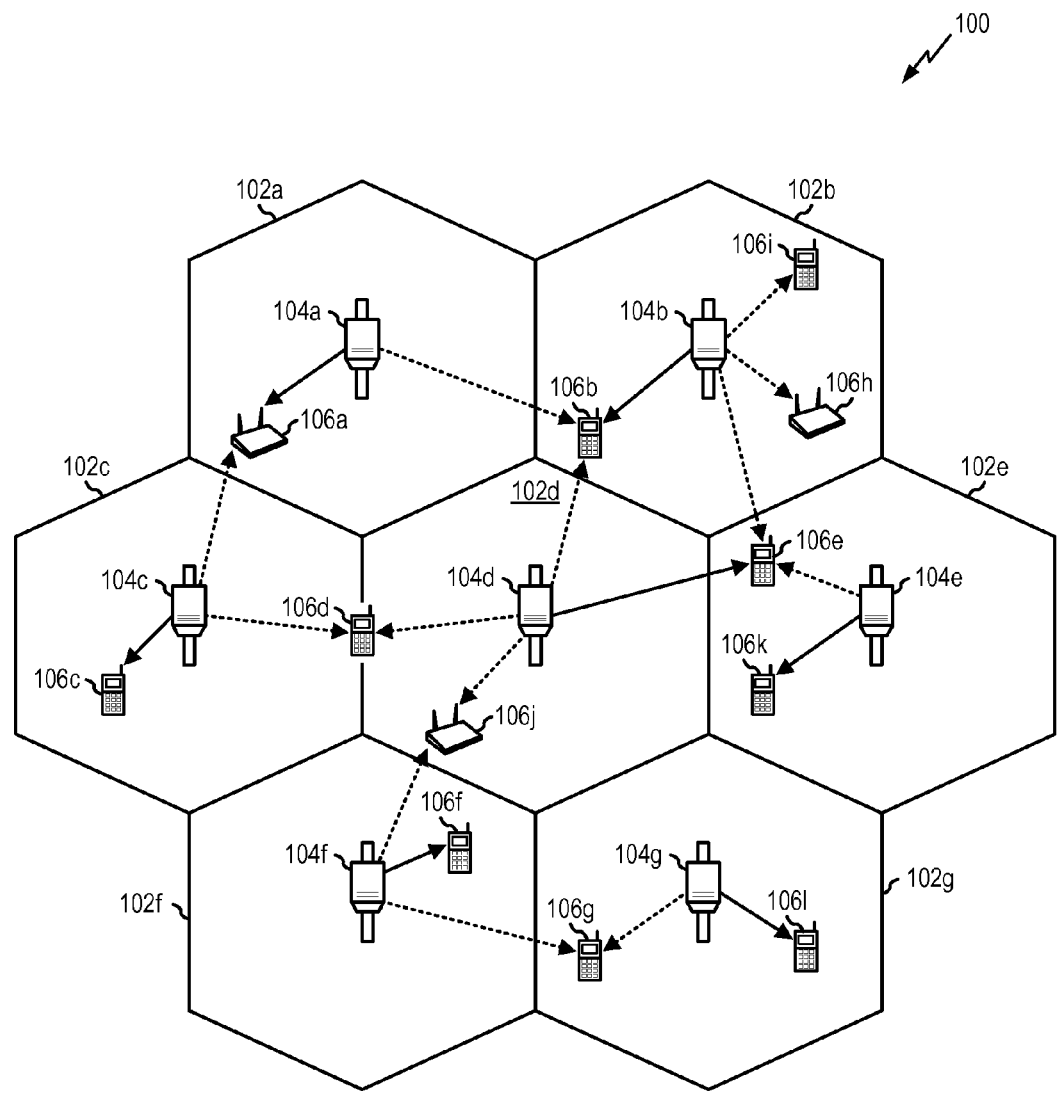
FIG. 1 illustrates an example of a wireless communication network in which aspects of the present disclosure may be employed.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

In some communication systems, each device may be associated with one or more device classes. Using device classes, network communications may be controlled by a network operator. For example, devices may be classified according to the service plan, quality of service (QoS) class, access priority, and subscriptions for each device. As another example, the devices may be classified according to the efficiency for accessing the network via a particular radio access technology. While signal strength and priority may be used to access a network, the level of control provided by these two factors is limited. What are described herein are additional levels of control which leverage device classifications to further refine the communication control.

Various aspects of the novel systems, apparatuses, and methods are described more fully hereinafter with reference to the accompanying drawings. The teachings of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary" is not necessarily to be construed as preferred or advantageous over other implementations. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the implementations shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Furthermore, in the following description, for reasons of conciseness and clarity, terminology associated with the UMTS systems is used. It should be emphasized that the disclosed techniques may also be applicable to other technologies, such as technologies and the associated standards related to LTE Advanced, LTE, W-CDMA, TDMA, OFDMA, High Rate Packet Data (HRPD), Evolved High Rate Packet Data (eHRPD), Worldwide Interoperability for Microwave Access (WiMax), GSM, enhanced data rate for GSM evolution (EDGE), and so forth. Terminologies associated with different technologies can vary. For example, depending on the technology considered, the User Equipment (UE) used in UMTS can sometimes be called a mobile station, a user terminal, a subscriber unit, an access terminal, etc., to name just a few. Likewise, Node B used in UMTS can sometimes be called an evolved Node B (eNodeB), an access node, an access point, a base station (BS), HRPD base station (BTS), and so forth. It should be noted here that different terminologies apply to different technologies when applicable.

FIG. 1 illustrates an example of a wireless communication network or system 100 in which aspects of the present disclosure may be employed. The wireless communication network 100 may operate pursuant to a wireless standard, for example the LTE Advanced standard, LTE standard, WiMax standard, GSM standard, EDGE standard, 802.11 standard, WiFi Advanced-N standard, and so forth. The wireless communication system 100 may include an access point (AP) 104, which communicates with stations (STAs) 106.

An access point (AP) may comprise, be implemented as, or known as a Node B, Radio Network Controller (RNC), eNodeB, Base Station Controller (BSC), Base Transceiver Station (BTS), Base Station (BS), Transceiver Function (TF), Radio Router, Radio Transceiver, or some other terminology.

A station STA may comprise, be implemented as, or known as an access terminal (AT), a subscriber station, a subscriber unit, a mobile station, a remote station, a remote terminal, a user terminal, a user agent, a user device, user equipment (UE), or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a wireless sensor device, a global positioning system device, or any other suitable device that is configured to communicate via a wireless medium.

A variety of processes and methods may be used for transmissions in the wireless communication system 100 between the AP 104 and the STAs 106. For example, messages (e.g., datagrams, signals, etc.) may be sent and received between the AP 104 and the STAs 106 in accordance with OFDM/OFDMA techniques. If this is the case, the wireless communication system 100 may be referred to as an OFDM/OFDMA system. Alternatively, messages may be sent and received between the AP 104 and the STAs 106 in accordance with W-CDMA or CDMA techniques. If this is the case, the wireless communication system 100 may be referred to as a W-CDMA or CDMA system.

A communication link that facilitates transmission from the AP 104 to one or more of the STAs 106 may be referred to as a downlink (DL), and a communication link that facilitates transmission from one or more of the STAs 106 to the AP 104 may be referred to as an uplink (UL). Alternatively, a downlink may be referred to as a forward link or a forward channel, and an uplink may be referred to as a reverse link or a reverse channel.

The AP 104 may be configured as a base station and provide wireless communication coverage in a basic service area (BSA) 102. Depending on the technology considered, BSA can sometimes be called coverage area, cell, etc. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

As shown in FIG. 1, multiple APs may provide different BSAs to the same device. For example, STA 106d may receive service from either AP 104c or AP 104d. In some implementations, this is referred to as overlap. In the overlap situation, the STA 106d may be configured to select which AP to use for service. For example, when a device powers up, the device may be configured to scan for messages identifying possible network service providers. As another example, when a device returns from an idle state, the device may be configured to re-select a network service provider. While in the idle state, the device may receive certain overhead messages including information that can be used to perform re-selection.

In some implementations, the service provided by the APs may be the same (e.g., LTE or eHRPD). In some implementations, the service provided by the APs may be different (e.g., AP 104c may be configured to provide LTE while AP 104d may be configured to provide eHRPD access). It will be understood that while the service described above refer to radio access technology service, the APs may be configured to provide other services which may be selected according the described methods and devices. Such services may include authorization services, application services, subscription services, or other services capable of selection from a plurality of providers within a network.

One approach to selecting an AP is to utilize the strongest signal strength. However, in the overlap situation such as that of STA 106d, the signal strength may be equal from both services but network loads in both sides may be totally different. It may be desirable to allow network operators to provide information to influence how the STA makes a selection such as when load is heavy. As will be described in further detail below, the AP may transmit information indicating devices or device classes that are permitted or denied to utilize a given service. The device receiving this information may be configured to determine whether the device is permitted or denied to utilize a service based at least in part on the received information and select from those which are permitted.

Figure 2:
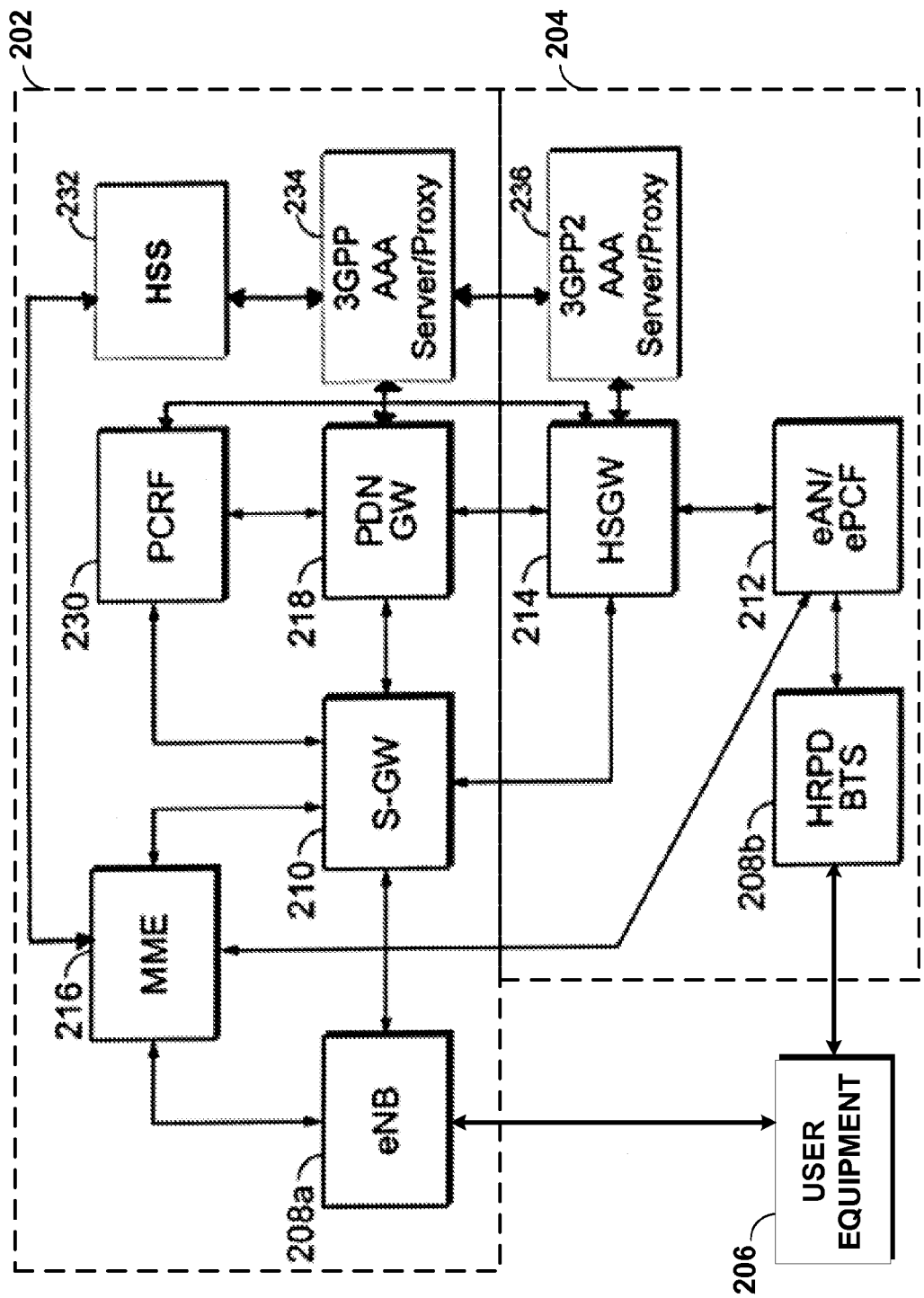
FIG. 2 illustrates an example of a functional block diagram of certain communication entities of the wireless communication network of FIG. 1.

FIG. 2 illustrates an example of a functional block diagram of certain communication entities of the wireless communication network of FIG. 1. The components shown in FIG. 2 illustrate a system in which a multimode or multiband device may communicate using multiple radio access technologies (RATs), for example an eHRPD network, an LTE network, etc. depending on the configuration of the network in the location in which the mobile device is currently operating. As FIG. 2 illustrates, the system 200 may include a radio access network RAN 202 that provides wireless radio communications between a UE 206 and an eNodeB 208a (e.g., a Node B, base station, access point, etc.) using LTE radio access technology. The system also depicts a RAN 204 which provides wireless radio communications between a UE 206 and a eHRPD base transceiver station (BTS) 208b (e.g., a Node B, base station, access point etc.) using eHRPD radio access technology. For simplicity of discussion, FIG. 2 depicts a UE 206 and one eNodeB 208a in a RAN and one HRPD BTS 208b in another RAN; however, it is to be appreciated that each RAN may include any number of UEs and/or eNodeBs/HRPD BTSs. In addition, it is to be appreciated that additional RANs may be included, such as UTRA, GSM, EDGE, and so forth.

In accordance with one aspect, the eNodeB 208a and HRPD BTS 208b may transmit information to a UE 206 over a forward link or downlink channel and a UE 206 can transmit information to the eNodeB 208a and HRPD BTS 209b over a reverse link or uplink channel. As shown, RANs can utilize any suitable type of radio access technology such as, but not limited to, LTE, LTE Advanced, HSPA, CDMA, HRPD, eHRPD, CDMA2000, GSM, GPRS, EDGE, UMTS, or the like.

The RANs, and specifically the eNodeB 208a and HRPD BTS 208b, can communicate with a core network that enables charging (e.g., usage charges for services, etc.), security (e.g., ciphering and integrity protection), subscriber management, mobility management, bearer management, QoS handling, policy control of data flows, and/or interconnections with external networks. The RANs and core network can communicate via an S1 interface, for instance. The core network can include a mobility management entity (MME) 216 that can be an end-point for control messaging from the RAN. The MME 216 can provide functions such as mobility management (e.g., tracking), authentication, and security. The MME 216 can communicate with the RANs via the S1. The core network can also include a serving gateway (S-GW) 210 which is a user plane node that connects the core network to the LTE RAN. The core network may also include a HRPD serving gateway (HSGW) 214 which connects the core network to the eHRPD RAN. The eHRDP RAN also includes an evolved access node (eAN) and an evolved packet control function (ePCF) entity 212 which manages the relay of packets between the HRPD BTS 208b and the HSGW 214.

In an aspect, the MME 216 can communicate with the S-GW 210 via an S11 interface, or communicate with eAN/ePCF 212 via an S101 interface. With S101 interface, the MME 216 and eAN/PCF 212 may be configured to exchange load information such as simple loaded indicator, percentages of its remaining resources, percentages of devices that are allowed or forbidden access, class of devices that are allowed or forbidden from access, identifiers of devices that are allowed or forbidden from access, and distribution of devices that are allowed or forbidden from access (e.g., x % for Class A, y % for Class B, etc.).

Furthermore, the HSGW 214 and the S-GW 210 may communicate to facilitate interoperability between the eHRPD network and the EPC. In another aspect, the MME 216 and S-GW 210 can be configured as a single node to provide a single end-point for user and control messaging originating from a RAN and/or terminating at a RAN. The network may also include a policy and charging rules function (PCRF) 230. The PCRF 230 may communicate with the S-GW 210, the HSGW 214, a PDN GW 218 and the core network.

The core network can also include a packet data network (PDN) gateway (GW) 218 that facilitates communications between the core network (and the RANs) and external networks. The PDN GW 218 can provide packet filtering, QoS policing, charging, IP address allocation, and routing of traffic to external networks. In an example, the S-GW 210 and the PDN GW 218 can communicate via an S5 interface. While illustrated as separate nodes in FIG. 2, it is to be appreciated that the S-GW 210 and PDN GW 218, for example, can be configured to operate as a single network node to reduce user plane nodes in core network. In one aspect, the core network may also include a 3GPP authentication, authorization and accounting (AAA) server/proxy 234 and a 3GPP2 AAA server/proxy 236 which many communicate with each other and further communicate with the PDN GW 218 and the HSGW 214 respectfully. The core network may also include a home subscriber services (HSS) entity 232 which may communicate with the MME 216 and the 3GPP AAA server/proxy 234. In some implementations, the path between the PDN GW 218 and the UE 206 may be referred to as a packet data network connection. A packet data network connection may be identified by one or more network (e.g., IP) addresses.

The core network can communicate with external networks via the PDN GW 218. The external networks, not shown, can include networks such as, but not limited to, a public switched telephone network (PSTN), an IP multimedia subsystem (IMS), and/or an IP network. The IP network can be the Internet, a local area network, a wide area network, an intranet, or the like. It should be appreciated that configuration shown in FIG. 2 is an example of just one possible configuration and many other configurations and additional components may be used in accordance with various aspects and implementations described below.

Figure 3:
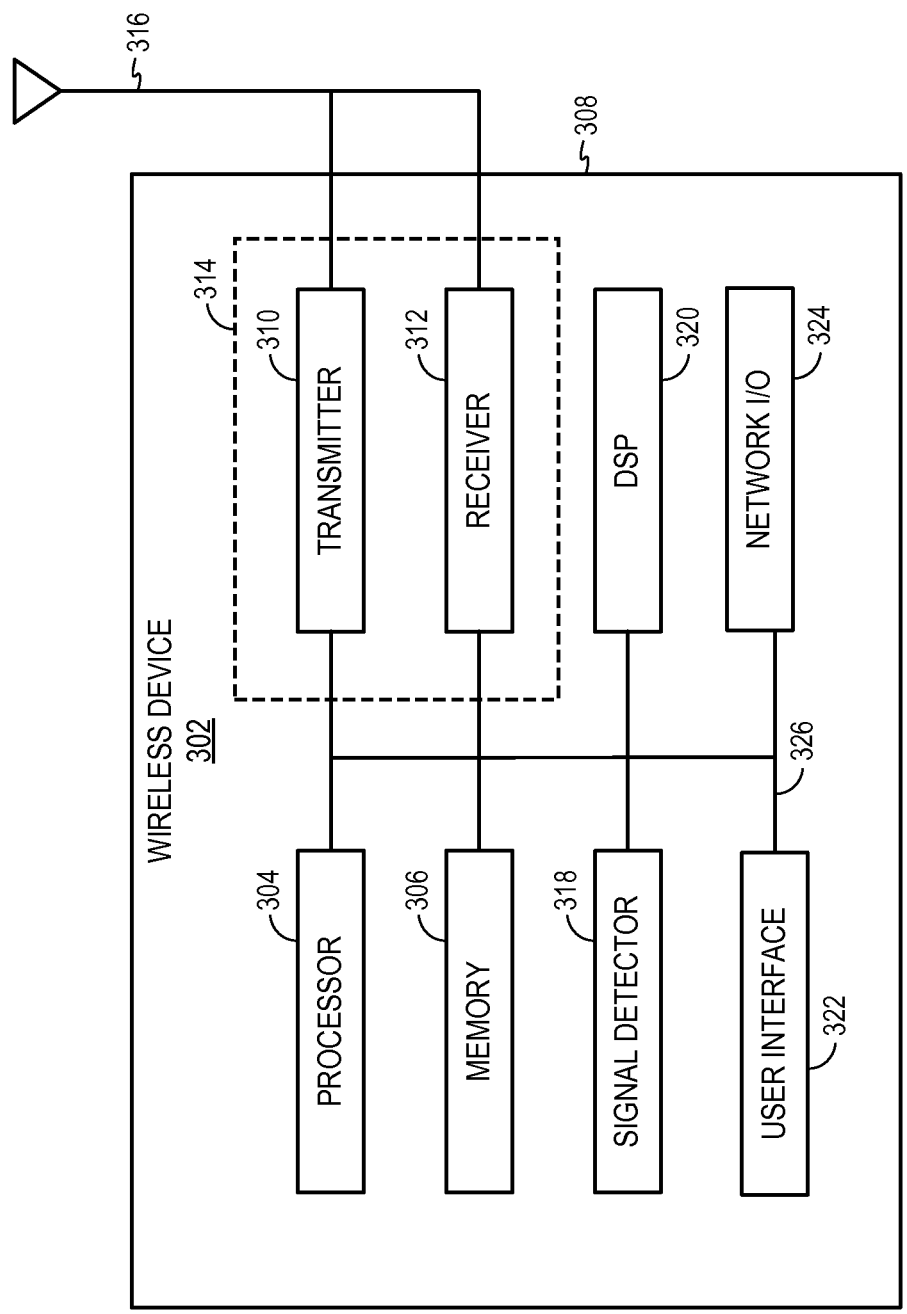
FIG. 3 illustrates an example of a functional block diagram of a wireless device that may be employed within the wireless communication network of FIG. 1.

FIG. 3 illustrates an example of a functional block diagram of a wireless device that may be employed within the wireless communication network of FIG. 1. The wireless device 302 is an example of a device that may be configured to implement the various methods described herein. For example, the wireless device 302 can comprise a STA, a UE, an AT, a subscriber station, a subscriber unit, a mobile station, a remote station, a remote terminal, a user terminal, a user agent, a user device, etc. As another example, the wireless device 302 may be multimode or multiband device, capable of operating using different radio access technologies (RATs), such as using LTE, LTE Advanced, HSPA, CDMA, HRPD, eHRPD, CDMA2000, GSM, GPRS, EDGE, UMTS, or the like at one or more frequencies.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The data in memory 306 may include configuration data. Configuration data may be preloaded into the memory 306. Configuration data may be obtained from a user of the wireless device 302 (e.g., through an interface 322, SIM card, download, over the air). The processor 304 may perform logical and arithmetic operations further based on the configuration data.

In some aspects, the processor 304 is configured to cause signals including data and/or messages to be sent and receive signals from another device (e.g., AP 104, STA 106, etc.). The signals may include information indicating which device(s) or class(es) of device(s) are permitted or denied access a provided network service. For example, in some implementations, the radio access provided by the device 302 may be experiencing a high volume of traffic. This information the processor 304 may cause transmission of a message indicating which device(s) or class(es) of device(s) are permitted or denied access the radio access technology of device 302. Thus the message is sent by the AP indicating the devices/classes that may access the AP. The processor 304 may be further configured to enforce the access permissions. For example, if a device indicated as not permitted to access the AP attempts to access the AP, the processor 304 may cause the access request to fail.

In some implementations, processor 304 may be configured send the information indicating which device(s) or class(es) of devices are permitted or denied access a provided network service based at least in part on criteria other than traffic volume. Such criteria may include AP capacity, random service distribution, and statistical service distribution.

In some implementations, a network input/output (I/O) module is provided 324. The network I/O module 324 may be configured to send and receive signals from network components (e.g., between APs). In some implementations, this may be referred to as backhaul signaling. It may be desirable for a device experiencing high volume of traffic to transmit a signal via the network I/O module 324 to other devices. As described above, the processor 304 of the other device may cause a signal to be sent indicating which device(s) or class(es) of device(s) are permitted or denied access the radio access technology of device 302. In some implementations, the signal may be sent from a first AP indicating the devices/classes that are permitted or denied access the second AP.

When the wireless device 302 is implemented as a STA, the processor 304 may be configured to select network services based at least in part on the received information indicating devices/device classes permitted or denied access a network service. This information may be stored in the memory 306 and the processor may be configured to compare the information with a previously obtained device identifier and device class for the wireless device 302.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that includes the transmitter 310 and/or the receiver 312 to allow transmission and reception of data between the wireless device 302 and a remote location. As alluded to above, the transmitter 310 may be configured to wirelessly transmit status information. Further, the receiver 312 may be configured to wirelessly receive user data. The transmitter 310 and receiver 312 may be combined into a transceiver 314. An antenna 316 may be attached to the housing 308 and electrically coupled to the transceiver 314. The wireless device 302 may also include (not shown) multiple transmitters, multiple receivers, multiple transceivers, and/or multiple antennas.

The wireless device 302 may also include a signal detector 318 that may be used in an effort to detect and quantify the level of signals received by the transceiver 314. The signal detector 318 may detect such signals as total energy, energy per subcarrier per symbol, power spectral density, and other signals. The wireless device 302 may also include a digital signal processor (DSP) 320 for use in processing signals. The DSP 320 may be configured to generate a packet for transmission and/or process a received packet.

In some aspects, the wireless device 302 may further comprise a user interface 322. The user interface 322 may comprise a keypad, a microphone, a speaker, and/or a display. The user interface 322 may include any element or component that conveys information to a user of the wireless device 302 and/or receives input from the user.

The various components of the wireless device 202 may be coupled together by a bus system 326. The bus system 326 may include a data bus, for example, as well as a power bus, a control signal bus, and a status signal bus in addition to the data bus. Those of skill in the art will appreciate the components of the wireless device 302 may be coupled together or accept or provide inputs to each other using some other mechanism.

Although a number of separate components are illustrated in FIG. 3, those of skill in the art will recognize that one or more of the components may be combined or commonly implemented. For example, the processor 304 may be used to implement not only the functionality described above with respect to the processor 304, but also to implement the functionality described above with respect to the signal detector 318 and/or the DSP 320. Further, each of the components illustrated in FIG. 3 may be implemented using a plurality of separate elements. For example, the processor 304 and the memory 306 may be embodied on a single chip. The processor 304 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

In this specification and the appended claims, it should be clear that the terms "circuit" and "circuitry" are construed as a structural terms and not as functional terms. For example, circuitry can be an aggregate of circuit components, such as a multiplicity of integrated circuit components, in the form of processing and/or memory cells, units, blocks, and the like, such as shown and described in FIG. 3. One or more of the functional blocks and/or one or more combinations of the functional blocks described with respect to the wireless device 302 may also be implemented as a combination of computing devices, e.g., a combination of a DSP and a microprocessor, a plurality of microprocessors, one or more microprocessor in conjunction with a DSP communication, or any other such configuration.

Figure 4:
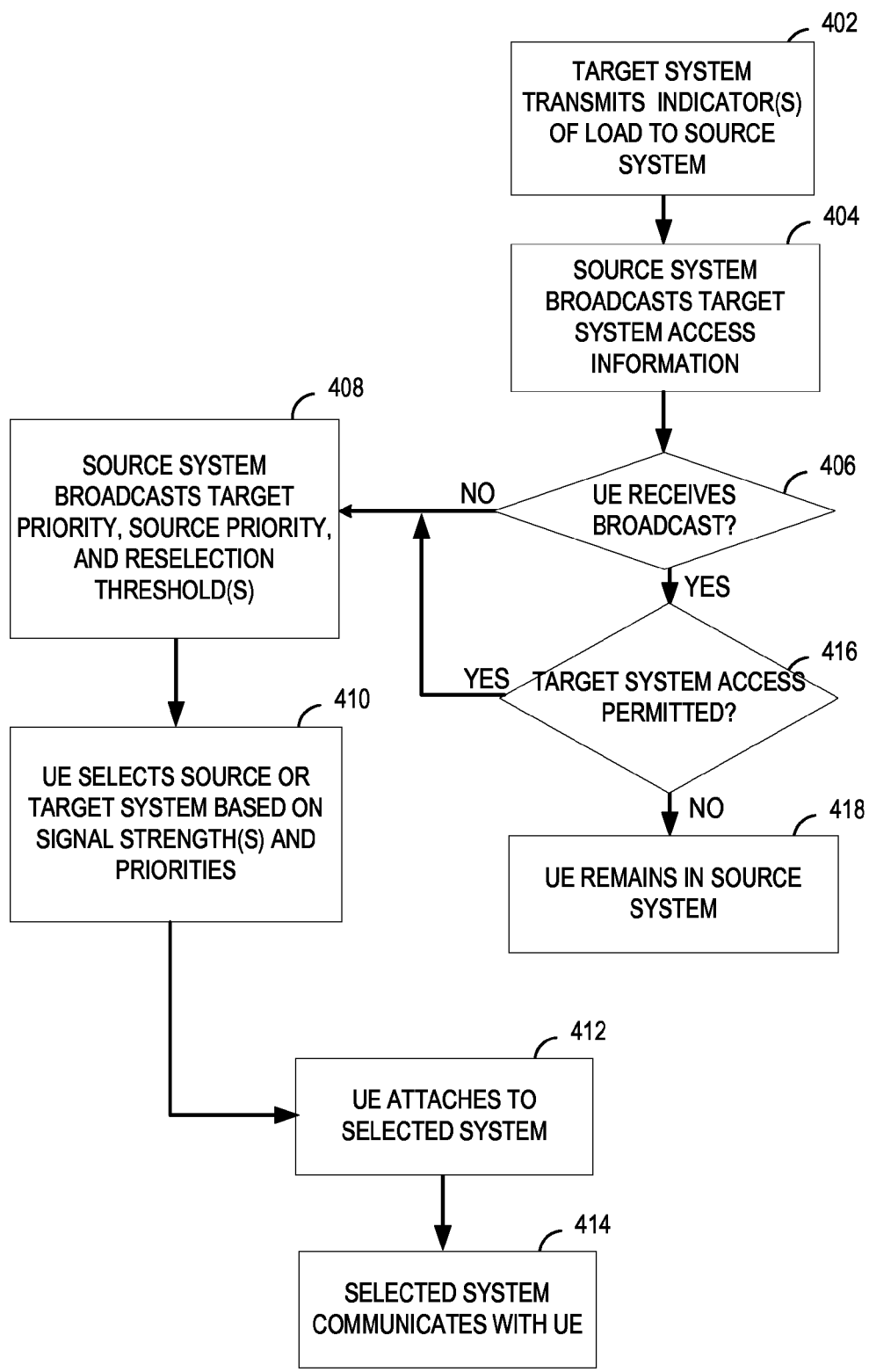
FIG. 4 illustrates a decision flow diagram for an exemplary method of system selection that may be employed within the wireless communication network of FIG. 1.

FIG. 4 illustrates a decision flow diagram for an exemplary method of system selection that may be employed within the wireless communication network of FIG. 1. The decision flow illustrated in FIG. 4 may be implemented, at least in part, by a wireless device as described herein. For example, the wireless device 302 may implement a portion of the decision flow.

The decision flow shown in FIG. 4 may be used to allow a network operator to influence which system providing a network service is accessed by devices. The example shown in FIG. 4, a source system and a target system are discussed. In this example, the source system may be an AP which provides a first network service. The source system is the system which the UE referenced in the example is configured to attach to. The target system may be an AP which provides an alternative network service to the first network service. The source system may be a system undergoing a lower traffic volume than the target system. Therefore, the source and target systems may exhibit the overlap described above. In such a situation, the network may be configured to forbid UE traffic from the source system to the target system.

In some implementations, the source system may be an eHRPD RAN and the target system may be an LTE RAN.

At block 402, the target system is identified as experiencing a high load. The identification of this condition may be accomplished via messaging through a network from the target system to one or more source systems. The target system may be the system configured to provide service in lieu of the source system. While this decision flow is shown to initiate based on load, as discussed herein, other criteria may be used to determine the devices and/or device classes permitted or denied access a network service. For example, the flow may be initiated by target network or system characteristics such as the number of carriers/frequencies in the network, the number of connections to the network, the number of connections in a particular state (e.g., idle, active) to the network, a number of connections for a service of the network, the number of connections in a particular state, a loaded indicator (e.g., a flag), percentages of remaining resources for the network or system, percentages of devices allowed or forbidden access, class of devices allowed or forbidden from access, identifiers of devices allowed or forbidden from access, distribution of devices allowed or forbidden from access, and aggregations or calculations (e.g., historical data, trend data, weighted averages) based on at least one of the above.

The source system may obtain the information from target system via an inter-system interface such as an S101 interface. The information may be transmitted one-way (e.g., target system to source system), or two ways (e.g., source also shares its load info with target system), or more ways (target system is connected to multiple other networks and systems).

At block 404, the source system may transmit the target system access information. In some implementations, the source system may transmit device identifiers and or device classes permitted or denied to access the target system. In some implementations, the source system may transmit device identifiers and or device classes denied access to the target system or a frequency of the target system. As show in FIG. 4, the transmission is a broadcast, however, the information may be unicast or multicast. For example, a RAN transmit the access information to the UEs through overhead messages or via remote provisioning such as OTAPA/OMA-DM and ANDSF or the like.

The target system access information may also include a randomization metric. The randomization metric may be used to determine whether the UE may attach to the target system using a frequency of the target system. For example, the randomization metric may be provided as a probability threshold. If the UEs of a specific class are directed to the target system, each UE may further consider the randomization metric before initiating handoff. This can ease the transition of UEs to the target system rather than having each UE handoff at or near the same moment in time. Accordingly, if the probability threshold is 70%, there is a 7 out of 10 chance a UE in the associated device class will handoff to the associated target system. The randomization metric may be provided in other ways such as a randomization metric function identifier specifying a process the UE is configured to call to receive the handoff determination. As another example, the randomization metric may be provided as a randomization seed value which may be used to commonly seed a random number generator shared by UEs of a given device class. The randomization metric may be provided as a selection threshold identifying a value at which the associated network is to be selected. For example, the threshold may be a number and selection is based on a comparison of a random generated number with the threshold value. The randomization metric may be provided as a range. For example, selection may be based on whether a value generated by the UE is within the range.

At block 406, a determination is made as to whether a UE configured to utilize the network service receives the broadcast information. The UE may not receive the broadcast information due to poor signal strength. The UE may receive a portion of the broadcast information but, due to degradation in the signal, may not be able to decode the included information. In some implementations, the UE may not receive the broadcast information because source system may not be transmitting the information (e.g., no load balancing needed, source system also loaded). In the event the UE does not receive the information, the process continues to block 408.

At block 408, the source system broadcasts a target priority, a source priority, and reselection signal strength threshold(s). The source system may broadcast this information in parallel with the information broadcast at block 404 or in an alternating fashion with the information broadcast at block 404. The priorities and threshold(s) may be obtained through static configuration, over the air dynamic configuration, backhaul signaling, overhead signaling, or other information exchange routes within the communication network.

Continuing to block 410, the UE selects one of the source system or target system based on one or more of the received priorities and signal strengths for each potential provider. At block 412, the UE initiates attachment to the selected system. This may be performed through the exchange of one or more messages with the selected system. As part of the obtaining access, the UE may transmit a device identifier and/or device class associated with the UE.

At block 414, the selected system may be configured to verify access by the UE. This may include determining whether the device identifier and/or class associated with the UE requesting access is permitted or denied to access the network service. In this way, the source or target system may ensure only permitted devices access the service. For example, the UE may not receive the broadcasted information from block 404. However, poor RF signal and per carrier priority information may lead the UE not to access the target system. At block 410, the UE may select the target system and attempt attachment at block 412.

Returning to decision block 406, if the UE receives the system access information, a determination as to whether access is permitted or denied to target system is performed at block 416. The UE will determine, based at least in part on the broadcast information whether target systems are available for access. As discussed above, the determination may include consideration of the randomization metric for the target system. In some implementations, the target system access information may explicitly identify a device and/or device class forbidden access to the target system. Conversely, the target system access information may explicitly identify a device and/or device class permitted to access the target system. This may be useful for known undesirable devices (e.g., stolen devices, high bandwidth usage devices) or devices with a high priority (e.g., emergency first responder device, premium subscriber device). If the UE is permitted access to the target system, the process continues to block 408 as described above. If the UE is not permitted access to the target system, the flow continues to block 418. At block 418, the UE stays in the source system.

While the above FIG. 4 generally describes selection between a source and a target system such as RANs, the selection process described may also be used to identify other services, applications, or quality of services provided by the network. For example when the target system becomes loaded, the source system (e.g., RAN) can transmit load balancing information to the UEs through overhead messages. The load balancing information may include an identification of which system the UEs should use for some applications or services. For example, the UE may be configured to use LTE for RCS/IMS. The load balancing information may include an identification of which system that that the UEs should use to meet certain QoS requirements. For example, the UE may be configured to use LTE for low latency services or applications.

Accordingly, when an application is launched by the UE, the UE may select an appropriate system based on the information received from the RAN. Certain aspects of the configuration may be conveyed to the device using remote provisioning such as OTAPA/OMA-DM (using ANDSF etc.) etc.

Figure 5:
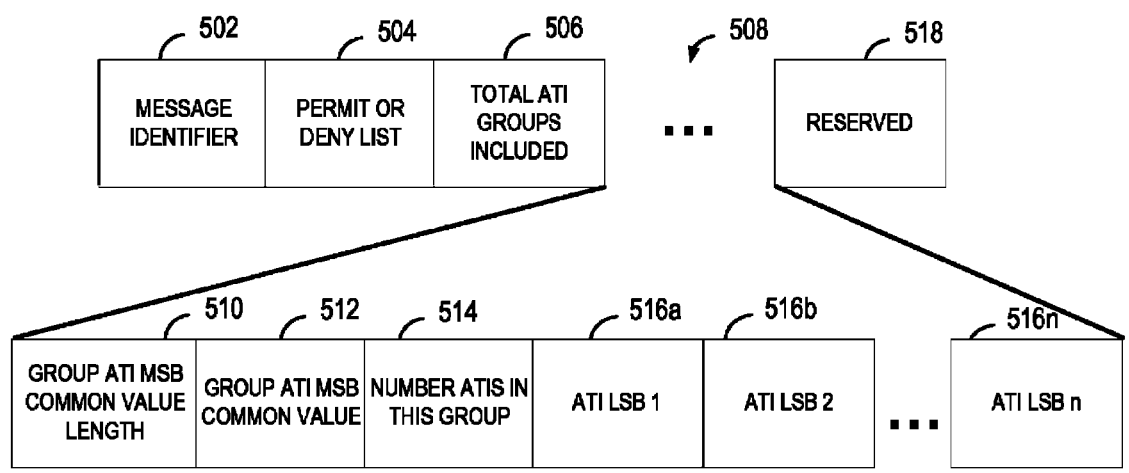
FIG. 5 illustrates a message diagram of an exemplary selection message that may be employed within the wireless communication network of FIG. 1.

FIG. 5 illustrates a message diagram of an exemplary selection message that may be employed within the wireless communication network of FIG. 1. The message illustrated in FIG. 5 may be used to broadcast access information indicating devices permitted or denied access a network service, a system, or a frequency as discussed above. The information shown in FIG. 5 relates to the access terminal identifier (ATI) associated with a UE. The message includes a message identifier field 502. The message identifier field 502 includes a value indicating the type of message included in the message. In some implementations, this may be a pre-defined value identifying the signal as an access information message.

The message may include a permit or deny list field 504. The permit or deny list field 504 may include a single bit indicating whether the devices identified in the message are devices that are to be permitted access or denied access.

The message may include a total ATI groups included field 506. The total ATI groups included field 506 may include a value indicating the total number of ATI groups included in the message.

Each ATI group will be represented by an instance of a portion 508. Each portion 508 includes a group ATI most significant bit common value length field 510. The most significant bits may be used to mask a group of ATIs governed by the access information included in the message. The group ATI most significant bit common value length field 510 includes a value indicating the length of the common most significant bit sequence for this group. A group ATI most significant bit common value field 512 may also be provided which includes a value indicating the most significant bit common value.

Each portion 508 includes a number of ATIs in this group field 514. The number of ATIs in this group field 514 includes a value indicating the number of ATIs included in this portion 508. Each portion 508 then includes at least one ATI least significant bit field. As shown in FIG. 5, three ATI least significant bit fields (ATI least significant bit field 516a, ATI least significant bit field 516b, and ATI least significant bit field 516n) are shown. It will be appreciated that one or more ATI least significant bit fields may be included in each portion 508.

The message may also include a reserved field 518. The reserved field 518 may be used to store extra processing information. For example, the reserved field 518 may include an AP identifier indicating which AP the access information corresponds to. The reserved field 518 may also include the randomization metric for the identified groups of access terminals.

The message shown in FIG. 5 may be included in an encapsulating message. Information included in the encapsulated message may also be used to convey access information. For example, the information identifying which AP the access information corresponds to may be included in the encapsulated message. Furthermore, it will be appreciated that the message shown in FIG. 5 is merely an example. Additional fields may be added to an access information message and fields may be omitted from the access information message shown without departing from the scope of the disclosure.

Figure 6:
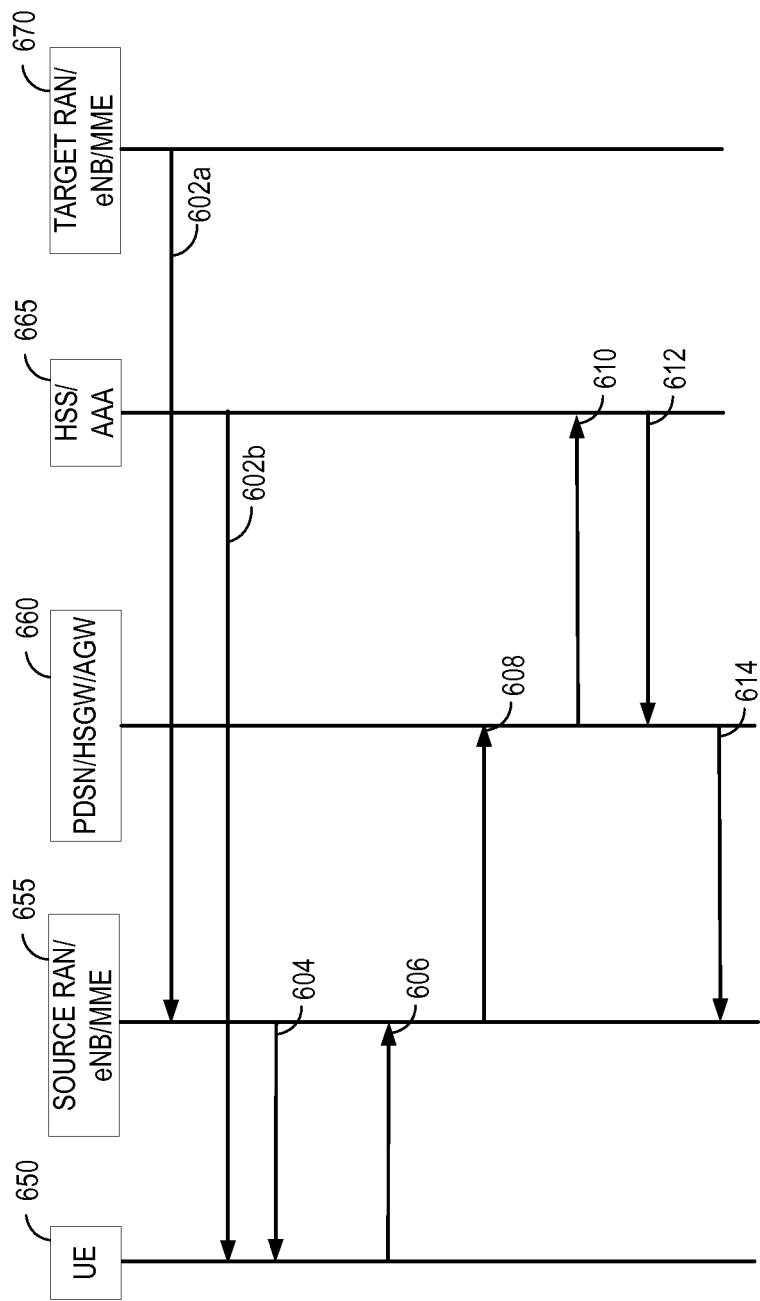
FIG. 6 illustrates a message exchange diagram of an exemplary method for controlling network communications that may be employed within the wireless communication network of FIG. 1.

FIG. 6 illustrates a message exchange diagram of an exemplary method for controlling network communications that may be employed within the wireless communication network of FIG. 1. The message exchange diagram illustrates several components of a communication system. The diagram includes a user equipment 650, a source RAN/eNB/MME 655, a PDSN/HSGW/AGW 660, a HSS/AAA 665, and a target RAN/eNB/MME 670.

A message 602a may be transmitted from the target RAN/eNB/MME 670 to the source RAN/eNB/MME 675. In some implementations, the message 602a may be transmitted directly between the entities. In some implementations, the message 602a may be transmitted via one or more intermediaries. The message 602a may include access information. For example, the message 602a may indicate the target RAN/eNB/MME 670 is experiencing a high traffic volume and include load information such as a loaded indicator (e.g., a flag), percentages of remaining resources for the network or system, percentages of devices allowed or forbidden access, class of devices allowed or forbidden from access, identifiers of devices allowed or forbidden from access, distribution of devices allowed or forbidden from access. In some implementations, the message 602a may include an indication of devices and/or device classes that are permitted or denied access the target RAN/eNB/MME 670.

Not shown is the initial messaging performed by the UE 650 to attach to the source network. While attached, the HSS/AAA 665 may transmit a message 602b including the device identifier and one or more device classes the attached UE 650 is associated with. In some implementations the device identifier may be an international mobile subscriber identifier (IMSI). Other device identifies may include universal/unicast access terminal identifier (UATI) or mobile equipment identifier (MEID).

At some point, the source RAN/eNB/MME 655 will transmit a message 604 including the access information based on the message 602a received from the target RAN/eNB 670 such as via an S101 interface. The UEs within the basic service area provided by the source RAN/eNB/MME 655 may receive this message 604. In some implementations, the UEs may receive the message 602b directly from the target RAN/eNB/MME 670.

Given a choice of target RAN/eNB/MME 670 and source RAN/eNB/MME 655, the UE 650 may use the information included in message 604 to select the source RAN/eNB/MME 655. The UE 650 may transmit a message 606 requesting access to the network service provided by the target system via the source RAN/eNB/MME 655. The message 606 may include the device identifier and/or device class associated with the UE 650.

The source RAN/eNB/MME 655 may transmit a message 608 to the PDSN/HSGW/AWG 660 requesting authorization for access by the requesting device identified by the message 606. The PDSN/HSGW/AWG 660 may be configured to transmit a message 610 requesting this information from the HSS/AAA 665. Based on pre-configured subscription information, an authorization database, pre-paid service, network conditions (e.g., load, volume, bandwidth) or other criteria, the HSS/AAA 665 will transmit a message 612 indicating whether or not the identified UE 650 is permitted access. The PDSN/HSGW/AWG 660 may, in turn, transmit a message 614 including all or part of this information to the source RAN/eNB/MME 655. It will be appreciated that any one or combination of the source RAN/eNB/MME 655, PDSN/HSGW/AWG 660, or HSS/AAA 665 may be used to enforce the access restrictions.

Accordingly, by the message exchanges shown in FIG. 6, several concepts described above converge. The inter-system communication messaging is shown by message 602a such as via an S101 interface. Provisioning of a device identifier and/or device class is shown by message 602b. Broadcast and selection of service provider is demonstrated by message 604 and 606 respectively. Enforcement of the access restrictions is exemplified by the message 608-614.

Figure 7:
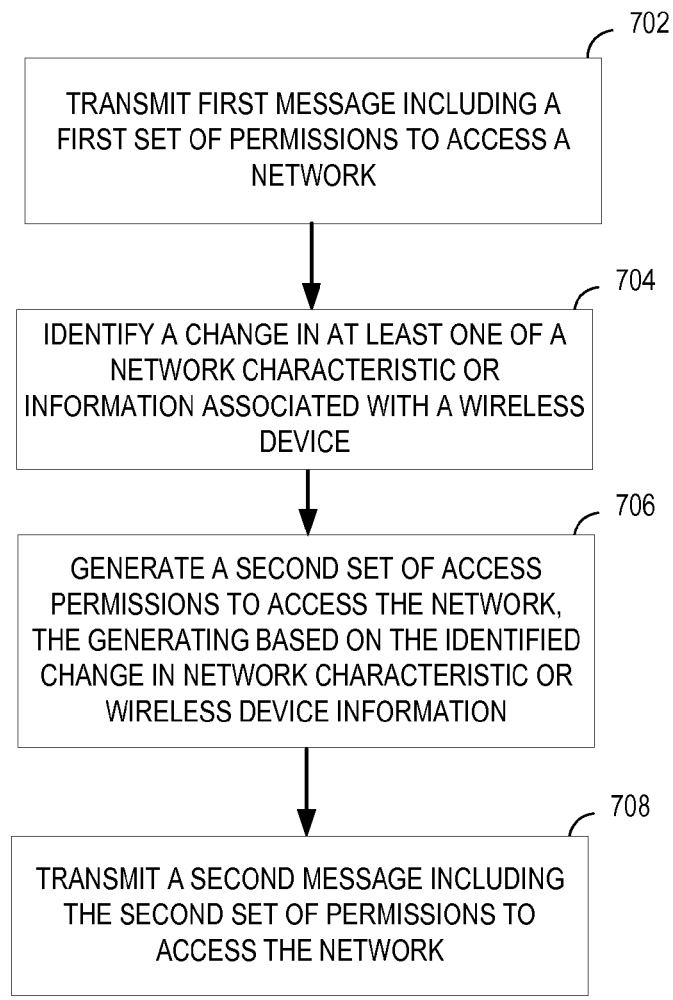
FIG. 7 illustrates process flow diagram of an exemplary method of wireless communication that may be employed within the wireless communication network of FIG. 1.

FIG. 7 illustrates process flow diagram of an exemplary method of wireless communication that may be employed within the wireless communication network of FIG. 1. The method shown in FIG. 7 may be implemented in a communication device 302, such as an access point, as shown in FIG. 3. At block 702, a first message including a first set of permissions to access a network is transmitted. Each permission is associated with at least one of a plurality of classes of devices. Each permission includes available access technologies for each identified device class and a randomization metric for each available access technology. At block 704, a change in at least one of a network characteristic (e.g., network load, a number of connections to the network, a loaded indicator, a percentage of remaining resources, access permissions for a percentage of users, access permissions for a class of devices, access permissions for one or more identifiers of devices, access permissions for a distribution of devices, a number of connections with the network) or information associated with a wireless device (e.g., subscription, priority, class, capability, location, quality of service, application identifier) is identified. At block 706, a second set of access permissions to access the network are generated. The generation is based on the identified change in network characteristic or wireless device information. The access permissions may indicate, for example, a radio access technology available for accessing the network. At block 708, a second message including the second set of permissions to access the network is transmitted.

Figure 8:
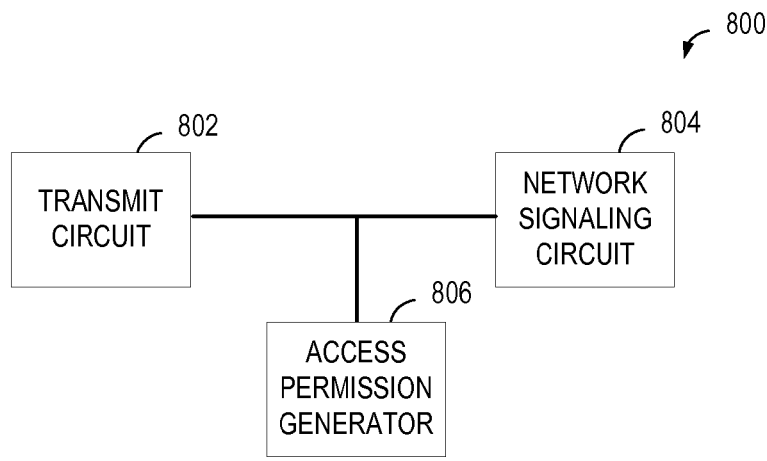
FIG. 8 illustrates a functional block diagram of another exemplary wireless communication device that may be employed within the wireless communication network of FIG. 1.

FIG. 8 illustrates a functional block diagram of another exemplary wireless communication device that may be employed within the wireless communication network of FIG. 1. The exemplary wireless communication device 800 may be configured to implement one or more of the methods described above. The wireless communication device 800 may encompass an access point.

Those skilled in the art will appreciate that a wireless communication device may have more components than the simplified wireless communication device 800 shown in FIG. 8. The wireless communication device 800 shown includes only those components useful for describing some prominent features of certain implementations. The wireless communication device 800 includes a transmit circuit 802, a network signaling circuit 804, and an access permission generator 806.

In some implementations, the transmit circuit 802 may be configured to transmit a first message and second message each including a set of permissions to access a network. The transmit circuit 802 may include one or more of a processor, a transmitter, an antenna, and a memory. In some implementations, means for transmitting may include the transmit circuit 802.

In some implementations, the network signaling circuit 804 may be configured to identify a change in at least one of a network characteristic or information associated with a wireless device. The network signaling circuit 804 may include one or more of a processor, a transmitter, a network I/O, and a memory. In some implementations, means for identifying a change in at least one of a network characteristic or information associated with a wireless device may include the network signaling circuit 804.

The access permission generator 806 may be configured to generate a set of access permissions to access the network. The access permission generator 806 may be configured to generate the access permissions based on the identified change in the network characteristic and/or information associated with a wireless device. The access permission generator 806 may include one or more of a memory, a processor, a randomizer, a look up table, and a clock. In some implementations, means for generating a second set of access permissions may include the access permission generator 806.

Figure 9:
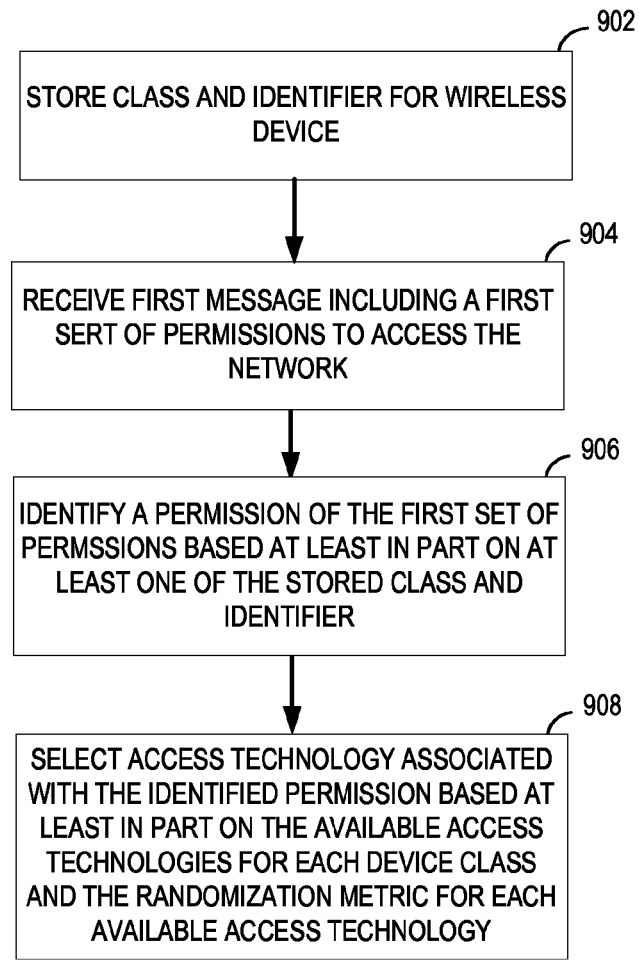
FIG. 9 illustrates process flow diagram of another exemplary method of wireless communication that may be employed within the wireless communication network of FIG. 1.

FIG. 9 illustrates process flow diagram of another exemplary method of wireless communication that may be employed within the wireless communication network of FIG. 1. The method shown in FIG. 9 may be implemented in a communication device 302, such as a user equipment, as shown in FIG. 3. At block 902, a class and an identifier for a wireless device are stored. As discussed above, the device class may be obtained through several mechanisms. In some implementations, the device class may be a hash of the device identifier (e.g., IMSUMEID/UATI). For example, an IMSI used in eHRPD can be based on the IMSI used in LTE side since the IMSI are generally unique. Use of UATI may lead to a ping-pong situation between LTE and eHRPD when the device moves from one AN to another AN because a UATI can get re-assigned. Accordingly, additional information may be included to preserve the uniqueness of the device information. Another method for obtaining the device class is through provisioning. For example, based on subscription information, devices may be classified into different groups (platinum, gold, silver etc.). The grade of subscription may correspond with access priority whereby some high priority users may be given preference to go to a given service as compared to other users. In some implementations, the class of the subscription is maintained by the AAA. In such implementations the AAA may be configured to send the subscription information to HSGW/PDSN which then provides the information to eAN/RNC. The class of subscription is provisioned at the device (say, USIM, SIM etc.). The subscription level can be associated either with NAI or with IMSI. In some implementations, it may be desirable to convey the class information to the device using remote provisioning such as OTAPA/OMA-DM (using ANDSF etc.).

In some implementations, it may be desirable to avoid ping-ponging at the network level. For example, if the access permissions are sending UEs of a certain class from a first network to a second network, the second network should be aware of the selection imposed by the access permissions. Accordingly, the second network should not redirect UEs who have been redirected from the first network back to the first network. This could prevent the UE from accessing either network. Therefore, the first network may also transmit the access permissions to the second network. The second network may then process an access request message from a device based on the classes of devices identified by the access permissions. For example, the access response message from the second network may direct the device to communicate with the first network when the device is not associated with a class of wireless devices included in the access permissions.

At block 904, a first message including a first set of permissions to access a network is received. Each permission is associated with at least one of a plurality of classes of devices. Each permission includes available access technology for each device class and a randomization metric for each available access technology.

At block 906, a permission of the first set of permissions is identified based at least in part on at least one of the stored class and identifier. For example, a UE receiving the first set of permissions may be configured to compare the class and/or identifier information stored with class and/or identifier information associated with the permissions. A permission having the same class and/or identifier value may be identified as applying to the UE.

At block 908, the access technology associated with the identified permission may be selected. The selection may be based at least in part on the available access technologies for each device class and the randomization metric for each available access technology. For example, multiple permissions may be provided for a given class. In such a situation, multiple access technologies may be available. The randomization metric may be used, as discussed above, to select one of the available access technologies.

Figure 10:
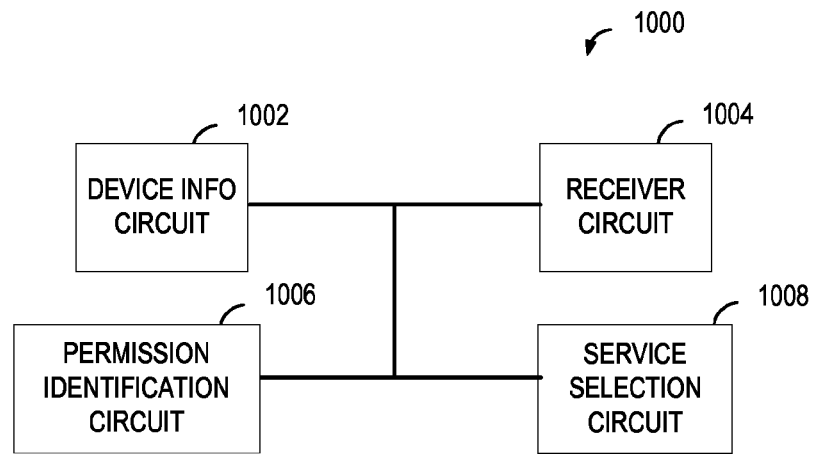
FIG. 10 illustrates a functional block diagram of a further exemplary wireless communication device that may be employed within the wireless communication network of FIG. 1.

FIG. 10 illustrates a functional block diagram of a further exemplary wireless communication device that may be employed within the wireless communication network of FIG. 1. The exemplary wireless communication device 1000 may be configured to implement one or more of the methods described above. The wireless communication device 1000 may encompass a user equipment.

Those skilled in the art will appreciate that a wireless communication device may have more components than the simplified wireless communication device 1000 shown in FIG. 10. The wireless communication device 1000 shown includes only those components useful for describing some prominent features of certain implementations. The wireless communication device 1000 includes a device information circuit 1002, a receiver circuit 1004, a permission identification circuit 1006, and a service selection circuit 1008.

In some implementations, the device information circuit 1002 may be configured to store a class and an identifier for the device 1000. The device information circuit 1002 may include one or more of a processor, a receiver, an antenna, and a memory. In some implementations, means for storing may include the device information circuit 1002.

In some implementations, the receiver circuit 1004 may be configured to receive a first message including a first set of permissions to access a network. The receiver circuit 1004 may include one or more of a processor, a receiver, an antenna, and a digital signal processor. In some implementations, means for receiving may include the receiver circuit 1004.

The permission identification circuit 1006 is configured to identify a permission of the first set of permissions based in part on at least one of the stored class and identifier. The permission identification circuit 1006 may include one or more of a comparator, a processor, and a memory. In some implementations, means for identifying a permission may include the permission identification circuit 1006.

In some implementations, the service selection circuit 1008 may be configured to select an access technology associated with the identified permission based at least in part on the available access technologies for each device class and the randomization metric for each available access technology. The service selection circuit 1008 may include one or more of a processor, a comparator, a memory, and a transmitter. In some implementations, means for selecting may include the service selection circuit 1008.

In some implementations including the inter-network service control as described above (e.g., inter-RAT control) the eHRPD/LTE UEs may be categorized into several device classes. Each UE be mapped to one of classes with an associated IMSI, MEID or UATI. For example if there are M classes, then the UE's mapped class is (IMSI or MEID or UATI) mod M. In some situations, such as when LTE load is heavy, eHRPD RAN may be configured to block some device classes of UEs to access LTE via overhead messages like SectorParamters/OtherRATNeighborList. The converse may also be applied for situations where HRPD load is heavy.

The systems and methods described above may be used to implement several degrees of control over the access to particular network services. For example, if an eHRPD RAN wants to prevent a certain percentage of total users from accessing LTE, but does not care which specific user are prevented from accessing LTE, the device class may be used to restrict access. If an eHRPD RAN wants to forbid a certain percentage of total users to access LTE, the device identifier may be used to identify forbidden users explicitly. Furthermore, in some situations both device class and device identifiers may be used to provide a hybrid mechanism to control access to network services.

After reading the overhead message, the UE may be configured to avoid attempting an access LTE if the UE's mapped class is in the LTE forbidden access list. The status may change overtime, and as such, the UE may receive a subsequent overhead message indicating access is permitted. If the UE's mapped class is not in LTE forbidden list, then the UE may be configured to further checks whether to be allowed for LTE access based on other aspects such as subscription service level, signal strength, etc.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for controlling network communications, the method comprising:
   transmitting, from a first access point associated with a first radio access technology to a wireless device, a first message including a first set of permissions to access a network via a second access point associated with a second radio access technology;
   identifying a change in at least one of a network characteristic of the second access point or information associated with the wireless device access of the second access point;
   generating a second set of access permissions to access the network via the second access point associated with the second radio access technology based on identifying the change in at least one of the network characteristic of the second access point or information associated with the wireless device access of the second access point; and
   transmitting, from the first access point to the wireless device, a second message including the second set of permissions to access the network via the second access point associated with the second radio access technology,
   wherein each permission of the second set of permissions is associated with at least one of a plurality of classes of devices and includes one or more available radio access technologies including at least the second radio access technology for accessing the second access point by each of the at least one of the plurality of classes of devices and a randomization metric indicative of a probability of initiating hand-off to a respective radio access technology of the one or more available radio access technologies by a respective wireless device of the at least one of the plurality of classes of devices.

2. The method of claim 1, wherein the network characteristic comprises one or more of a network load, a network frequency load, a number of connections to the network, a number of connections to a frequency of the network, a loaded indicator, a percentage of remaining resources, an access permission for a percentage of users, an access permission for a class of devices, an access permission for one or more identifiers of devices, an access permission for a distribution of devices, or a number of connections with the network via at least the second access point.

3. The method of claim 1, wherein the information associated with the wireless device comprises one or more of a class for the wireless device, a capability of the wireless device, a location of the wireless device, an access priority level, a quality of service requirement, or an application identifier.

4. The method of claim 1, wherein one or both of the first radio access technology or the second radio access technology includes at least one of long term evolution based access, evolved high rate data packet based access, or cdma2000 spread spectrum system access.

5. The method of claim 1, wherein a permission of the first set of permissions or the second set of permissions includes an identifier for a specific wireless device.

6. The method of claim 1, further comprising:
   receiving a registration request from the wireless device, the registration request including an identifier for the wireless device;
   determining a device class for the wireless device based at least in part on the received identifier; and
   transmitting a message including the device class for the wireless device.

7. The method of claim 6, wherein the identifier for the wireless device comprises one or more of an International Mobile Subscriber Identity (IMSI), a Mobile Equipment Identifier (MEID), or a Unicast Access Terminal Identifier (UATI).

8. The method of claim 1, further comprising:
   receiving an access request including an identifier of the wireless device; and
   determining one or more access permissions of the network for the wireless device.

9. The method of claim 8, wherein determining the one or more access permissions of the network for the wireless device comprises comparing the identifier of the wireless device or a device class associated with the wireless device with a list indicating devices permitted access.

10. The method of claim 1, wherein transmitting the first message or the second message comprises at least one of unicasting, multicasting, or broadcasting.

11. The method of claim 1, wherein the randomization metric comprises one or more of a random number generator seed value for the device class, a selection threshold identifying a value for initiating hand-off to the respective access technology, or a selection range wherein a value within the selection range satisfies the criteria for initiating hand-off to the respective access technology.

12. The method of claim 1, further comprising:
receiving from another network a message including a third set of permissions for the another network;
receiving an access request from another wireless device included in the plurality classes of devices included in the third set of permissions; and
transmitting an access response message based at least in part on a comparison of the message and the access request.

13. The method of claim 12, wherein transmitting the access response message comprises transmitting a message to the another wireless device directing the another wireless device to communicate with the first network when the another wireless device is not associated with a class of wireless devices included in the third set of permissions; and
wherein transmitting the access response message comprises transmitting a message to the another wireless device indicating successful access to the second network.

14. The method of claim 1, wherein the randomization metric is further indicative of the probability of initiating hand-off to the second radio access technology of the second access point by the wireless device, the wireless device associated with the at least one of the plurality of classes of devices permitted to access the second access point.

15. The method of claim 1, wherein identifying the change includes receiving, from the second access point, an indication of the change in at least one of the network characteristic of the second access point or information associated with the wireless device access of the second access point.

16. The method of claim 1, wherein the first radio access technology is different from the second radio access technology.

17. An apparatus for controlling network communications, the apparatus comprising:
a transmitter configured to transmit, via a first radio access technology to a wireless device, a first message indicating a first set of permissions to access a network via a second access point associated with a second radio access technology; and
a processor configured to identify a change in at least one of a network characteristic of the second access point or information associated with the wireless device access of the second access point and to generate a second set of permissions to access the network via the second access point associated with the second radio access technology based on the identified change in at least one of the network characteristic of the second access point or information associated with the wireless device access of the second access point,
wherein the transmitter is further configured to transmit, to the wireless device, a second message including the second set of permissions to access the network via the second access point associated with the second radio access technology, and
wherein each permission of the second set of permissions is associated with at least one of a plurality of classes of devices and includes one or more available radio access technologies including at least the second radio access technology for accessing the second access point by each of the at least one of the plurality of classes of devices and a randomization metric indicative of a probability for initiating hand-off to a respective radio access technology of the one or more available radio access technologies by a respective wireless device of the at least one of the plurality of classes of devices.

18. The apparatus of claim 17, wherein the network characteristic comprises one or more of a network load, a network frequency load, a number of connections to the network, a number of connections to a frequency of the network, a loaded indicator, a percentage of remaining resources, an access permission for a percentage of users, an access permission for a class of devices, an access permission for one or more identifiers of devices, an access permission for a distribution of devices, or a number of connections with the network via at least the second access point.

19. The apparatus of claim 17, wherein the information associated with the wireless device comprises one or more of a class for the wireless device, a capability of the wireless device, a location of the wireless device, an access priority level, a quality of service requirement, or an application identifier.

20. The apparatus of claim 17, wherein one or both of the first radio access technology or the second radio access technology includes at least one of long term evolution based access, evolved high rate data packet based access, or cdma2000 spread spectrum system access.

21. The apparatus of claim 17, wherein a permission of the first set of permissions or the second set of permissions includes an identifier for a specific wireless device.

22. The apparatus of claim 17, wherein the receiver is further configured to receive a registration request from the wireless device, the registration request including an identifier for the wireless device,
wherein the processor is further configured to determine a device class for the wireless device based at least in part on the received identifier, and
wherein the transmitter is further configured to transmit a message including the device class for the wireless device.

23. The apparatus of claim 22, wherein the identifier for the wireless device comprises one or more of an International Mobile Subscriber Identity (IMSI), a Mobile Equipment Identifier (MEID), or a Unicast Access Terminal Identifier (UATI).

24. The apparatus of claim 17, wherein the receiver is further configured to receive an access request including an identifier of the wireless device, and
wherein the processor is further configured to determine one or more access permissions for the network of the wireless device.

25. The apparatus of claim 24, wherein to determine the one or more access permissions of the network for the wireless device, the processor is further configured to compare the identifier of the wireless device or a device class associated with the wireless device with a list indicating devices permitted access.

26. The apparatus of claim 17, wherein the transmitter is configured to transmit the first message or the second message via at least one of unicasting, multicasting, or broadcasting.

27. The apparatus of claim 17, wherein the randomization metric comprises one or more of a random number generator seed value for the device class, a selection threshold identifying a value for initiating hand-off to the respective access technology, or a selection range wherein a value within the selection range satisfies the criteria for initiating hand-off to the respective access technology.

28. The apparatus of claim 17, wherein the receiver is configured to from another network a message including a third set of permissions for the another network and to receive an access request from another wireless device included in the plurality classes of devices included in the third set of permissions, and
wherein the transmitter is configured to transmit an access response message based at least in part on a comparison of the message and the access request.

29. The apparatus of claim 28, wherein the transmitter is configured to transmit a message to the another wireless device directing the another wireless device to communicate with the first network when the another wireless device is not associated with a class of wireless devices included in the third set of permissions; and
wherein transmitting the access response message comprises transmitting a message to the another wireless device indicating successful access to the second network.

30. A non-transitory computer-readable storage medium storing computer executable code, comprising code for:
transmitting, from a first access point associated with a first radio access technology to a wireless device, a first message including a first set of permissions to access a network via a second access point associated with a second radio access technology;
identifying a change in at least one of a network characteristic of the second access point or information associated with the wireless device access of the second access point;
generating a second set of permissions to access the network via the second access point associated with the second radio access technology based on identifying the change in at least one of the network characteristic of the second access point or information associated with the wireless device access of the second access point; and
transmitting, from the first access point to the wireless device, a second message including the second set of permissions to access the network via the second access point associated with the second radio access technology,
wherein each permission of the second set of permissions is associated with at least one of a plurality of classes of devices and includes one or more available radio access technologies including at least the second radio access technology for accessing the second access point by each of the at least one of the plurality of classes of devices and a randomization metric indicative of a probability of initiating hand-off to a respective radio access technology of the one or more available radio access technologies by a respective wireless device of the at least one of the plurality of classes of devices.

31. An apparatus for controlling network communications, the apparatus comprising:
means for transmitting, from a first access point associated with a first radio access technology to a wireless device, a first message including a first set of permissions to access a network via a second access point associated with a second radio access technology;
means for identifying a change in at least one of a network characteristic of the second access point or information associated with the wireless device access of the second access point;
means for generating a second set of permissions to access the network via the second access point associated with the second radio access technology based on identifying the change in at least one of the network characteristic of the second access point or information associated with the wireless device access of the second access point; and
means for transmitting, from the first access point to the wireless device, a second message including the second set of permissions to access the network via the second access point associated with the second radio access technology,
wherein each permission of the second set of permissions is associated with at least one of a plurality of classes of devices and includes one or more available radio access technologies including at least the second radio access technology for accessing the second access point by each of the at least one of the plurality of classes of devices and a randomization metric indicative of a probability of initiating hand-off to a respective radio access technology of the one or more available radio access technologies by a respective wireless device of the at least one of the plurality of classes of devices.

32. A method for selecting communication network access, the method comprising:
storing, at a wireless device, a device class and an identifier for the wireless device;
receiving, from a first access point associated with a first radio access technology, a first message including a first set of permissions to access a network via a second access point associated with a second radio access technology, wherein each permission of the first set of permissions is associated with at least one of a plurality of classes of devices and includes one or more available radio access technologies including at least the second radio access technology for accessing the second access point by for each of the at least one of the plurality of classes of devices and a randomization metric indicative of a probability of initiating hand-off to a respective radio access technology of the one or more available radio access technologies by a respective wireless device of the at least one of the plurality of classes of devices; and
identifying a permission of the first set of permissions based in part on at least one of the stored device class and identifier; and
selecting the second radio access technology based at least on the identified permission indicating the second radio access technology and a randomization metric associated with the second radio access technology.

33. The method of claim 32, further comprising receiving, from the first access point, a second message including a second set of permissions to access the network via the second access point associated with the second radio access technology, wherein selecting the radio access technology is based at least in part on the received second message.

34. The method of claim 32, wherein one or both of the first radio access technology or the second radio access technology includes at least one of long term evolution based access, evolved high rate data packet based access, or cdma2000 spread spectrum system access.

35. The method of claim 32, wherein at least one of the device class and the identifier for the wireless device is associated with an access priority level, and wherein selecting the second radio access technology is further based on the access priority level.

36. The method of claim 32, wherein storing the device class comprises:
    receiving a message including the device class; and
    storing the device class.

37. The method of claim 32, wherein the identifier for the wireless device comprises one or more of an International Mobile Subscriber Identity (IMSI), a Mobile Equipment Identifier (MEID), or a Unicast Access Terminal Identifier (UATI).

38. The method of claim 32, wherein the randomization metric comprises one or more of a random number generator seed value for the device class, a selection threshold identifying a value for initiating hand-off to the respective access technology, or a selection range wherein a value within the selection range satisfies the criteria for initiating hand-off to the respective access technology.

39. The method of claim 32, wherein selecting the access technology comprises:
    generating a random value; and
    selecting the second radio access technology using a comparison of the random value to the randomization metric.

40. An apparatus for selecting a communication network, the apparatus comprising:
    a memory storing a device class and an identifier for the apparatus;
    a receiver configured to receive, from a first access point associated with a first radio access technology, a first message including a first set of permissions to access a network via a second access point associated with a second radio access technology, wherein each permission of the first set of permissions is associated with at least one of a plurality of classes of devices and includes one or more available radio access technologies including at least the second radio access technology for accessing the second access point by for each of the at least one of the plurality of classes of devices and a randomization metric indicative of a probability of initiating hand-off to a respective radio access technology of the one or more available radio access technologies by a respective wireless device of the at least one of the plurality of classes of devices; and
    a service selection circuit configured to identify a permission of the first set of permissions based in part on at least one of the stored device class and the stored identifier and to select the second radio access technology based at least on the identified permission indicating the second radio access technology and a randomization metric associated with the second radio access technology.

41. The apparatus of claim 40, wherein the receiver is configured to:
    receive at least one of the identifier and the device class; and
    store the received least one of the identifier and the device class in the memory.

42. The apparatus of claim 40, wherein the identifier comprises one or more of an International Mobile Subscriber Identity (IMSI), a Mobile Equipment Identifier (MEID), or a Unicast Access Terminal Identifier (UATI).

43. The apparatus of claim 40, wherein the first message includes the device class and an identifier for the apparatus.

44. The apparatus of claim 43, wherein the identifier for the apparatus comprises one or more of an International Mobile Subscriber Identity (IMSI), a Mobile Equipment Identifier (MEID), or a Unicast Access Terminal Identifier (UATI).

45. The apparatus of claim 40, wherein the receiver is further configured to receive a second message including a second set of access permissions for the network, and wherein selecting one of a plurality of network services is based at least in part on the received second message.

46. The apparatus of claim 40, wherein the first set of access permissions to access the network includes one or both of the first radio access technology or the second radio access technology for accessing the network.

47. The apparatus of claim 46, wherein one or both of the first radio access technology or the second radio access technology includes at least one of long term evolution based access, evolved high rate data packet based access, or cdma2000 spread spectrum system access.

48. The apparatus of claim 40, wherein at least one of the device class and the identifier is associated with an access priority level, and wherein the service selection circuit is further configured to select the second radio access technology is further based on the access priority level.

49. The apparatus of claim 40, wherein the randomization metric comprises one or more of a random number generator seed value for the device class, a selection threshold identifying a value for initiating hand-off to the respective access technology, or a selection range wherein a value within the selection range satisfies the criteria for initiating hand-off to the respective access technology.

50. The apparatus of claim 40, further comprising a random value generator, wherein the service selection circuit is configured to selecting the second radio access technology using a comparison of a value generated by the random value generator and the randomization metric.

51. A non-transitory computer-readable storage medium storing computer executable code, comprising code for:
    storing a device class and an identifier for the apparatus;
    receiving, from a first access point associated with a first radio access technology, a first message including a first set of permissions to access a network via a second access point associated with a second radio access technology, wherein each permission of the first set of permissions is associated with at least one of a plurality of classes of devices and includes one or more available radio access technologies including at least the second radio access technology for accessing the second access point by for each of the at least one of the plurality of classes of devices and a randomization metric indicative of a probability of initiating hand-off to a respective radio access technology of the one or more available radio access technologies by a respective wireless device of the at least one of the plurality of classes of devices; and
    identifying a permission of the first set of permissions based in part on at least one of the stored device class and identifier; and
    selecting the second radio access technology based at least on the identified permission indicating the second radio access technology and a randomization metric associated with the second radio access technology.

52. An apparatus for selecting communication network access, the apparatus comprising:
    means for storing, a device class and an identifier for the apparatus;
    means for receiving, from a first access point associated with a first radio access technology, a first message including a first set of permissions to access a network via a second access point associated with a second radio access technology, wherein each permission of the first set of permissions is associated with at least one of a plurality of classes of devices and includes one or more available radio access technologies including at least the second radio access technology for accessing the second access point by for each of the at least one of the plurality of classes of devices and a randomization metric indicative of a probability of initiating hand-off to a respective radio access technology of the one or more available radio access technologies by a respective wireless device of the at least one of the plurality of classes of devices; and means for identifying a permission of the first set of permissions based in part on at least one of the stored device class and the stored identifier; and means for selecting the second radio access technology based at least on the identified permission indicating the second radio access technology and a randomization metric associated with the second radio access technology.

* * * * *